UNITED STATES PATENT OFFICE.

PAUL EHRLICH AND HUGO BAUER, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

COLORED COMPOUNDS OF THE SELENO-AZIN SERIES AND PROCESS OF MAKING SAME.

1,087,157. Specification of Letters Patent. Patented Feb. 17, 1914.

No Drawing. Application filed April 4, 1913. Serial No. 758,969.

*To all whom it may concern:*

Be it known that we, PAUL EHRLICH, M. D., professor of medicine, and HUGO BAUER, Ph. D., chemist, citizens of the Empire of Germany, residing at Frankfort-on-the-Main, Germany, have invented certain new and useful Improvements in Colored Compounds of the Seleno-Azin Series and Processes of Making Same, of which the following is a specification.

Our invention relates to the manufacture of compounds of the selenoazin series. We have found that by reducing and subsequently oxidizing the nitro derivatives of the selenoazin:

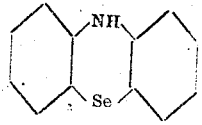

colored substances are obtained, valuable for therapeutical purposes. Said derivatives of the selenoazin can be prepared by treating ortho-aminoselenophenol with di- or trinitro-halogenbenzene, as indicated by the following equation:

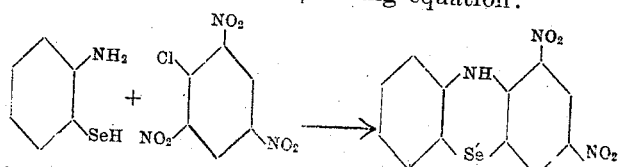

The new products obtainable therefrom by reduction and subsequent oxidation are most probably salts of the amino derivatives of phenazselenonium-hydroxid having the formula:

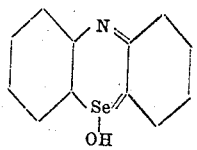

They are colored substances, soluble in water, which by reduction are transformed into amino derivatives of the selenoazin.

The following examples illustrate our invention.

Example I: Dinitrophenoseleno-azin, obtained from picryl chlorid and ortho-aminoselenophenol, is treated with calculated quantities of stannous chlorid and hydrochloric acid, taking care that the temperature does not exceed +50° C. By then cooling below this temperature, the double tin salt of the resulting leuco-base separates. From the aqueous solution of the said tin salt the tin is precipitated by means of hydrogen sulfid, and from the filtrate from this precipitate the new compound is precipitated by introducing air or, preferably, by adding ferric chlorid. The compound thus obtained is soluble in water to a greenish-brown solution, and when recrystallized forms dark needles having a green metallic luster.

Example II: The dinitrophenoseleno-azin mentioned in Example I, can be transformed into trinitrophenoseleno-azin by treating it with an excess of nitric acid in glacial acetic acid. The product is a red substance, which is converted into a dyestuff in the manner described in Example I. The dyestuff thus obtained forms small dark needles having a green metallic luster, soluble in water to a violet solution.

Having now described our invention, what we claim is:

1. The herein-described process of manufacturing colored products, being salts of amino derivatives of phenazselenonium-hydroxid, which consists in first reducing a nitro derivative of phenoseleno-azin and then oxidizing the product of reduction.

2. As new products, salts of amino derivatives of phenazselenonium hydroxid, being colored compounds, which yield amino derivatives of seleno-azin when treated with a reducing agent, being soluble in water and forming, when crystallized, needles of a dark color and a metallic luster.

In testimony whereof, we affix our signatures in presence of two witnesses.

PAUL EHRLICH.
HUGO BAUER.

Witnesses:
CARL GRUND,
ELSE MEBUS.

It is hereby certified that in Letters Patent No. 1,087,157, granted February 17, 1914, upon the application of Paul Ehrlich and Hugo Bauer, of Frankfort-on-the-Main, Germany, for an improvement in "Colored Compounds of the Seleno-Azin Series and Processes of Making Same," an error appears in the printed specification requiring correction as follows: Line 82, for the compound word "seleno-azin" read *phenoseleno-azin;* and that the said Letters Patent should be read with this correction therein that the same may conform to the record of the case in the Patent Office.

Signed and sealed this 6th day of July, A. D., 1915.

[SEAL.]

R. F. WHITEHEAD,
*Acting Commissioner of Patents.*